US008918251B2

(12) United States Patent  
Tarnutzer et al.

(10) Patent No.: US 8,918,251 B2  
(45) Date of Patent: Dec. 23, 2014

(54) CAN BASED VEHICLE IMMOBILIZER

(71) Applicants: Stephan A Tarnutzer, Shelby Twp, MI (US); Thomas Prohaszka, Armada, MI (US)

(72) Inventors: Stephan A Tarnutzer, Shelby Twp, MI (US); Thomas Prohaszka, Armada, MI (US)

(*) Notice: Subject to any disclaimer, the term of this patent is extended or adjusted under 35 U.S.C. 154(b) by 0 days.

(21) Appl. No.: 14/180,477

(22) Filed: Feb. 14, 2014

(65) Prior Publication Data

US 2014/0229061 A1 Aug. 14, 2014

Related U.S. Application Data

(60) Provisional application No. 61/764,590, filed on Feb. 14, 2013.

(51) Int. Cl.
*B60R 25/00* (2013.01)
*B60R 16/023* (2006.01)
*B60R 25/04* (2013.01)

(52) U.S. Cl.
CPC ............ *B60R 16/0231* (2013.01); *B60R 25/04* (2013.01)
USPC ..................... 701/36; 340/425.5; 340/426.11; 340/426.12; 340/426.13

(58) Field of Classification Search
None
See application file for complete search history.

(56) References Cited

U.S. PATENT DOCUMENTS

| | | | | |
|---|---|---|---|---|
| 5,675,490 A * | 10/1997 | Bachhuber | ................ | 701/29.6 |
| 6,191,703 B1 * | 2/2001 | Wallace | ................ | 340/4.34 |
| 6,249,731 B1 * | 6/2001 | Miller et al. | ................ | 701/48 |
| 7,402,920 B2 * | 7/2008 | Kamiya | ................ | 307/10.6 |
| 2003/0011487 A1 * | 1/2003 | Bracklo et al. | ................ | 340/825.72 |
| 2003/0164033 A1 * | 9/2003 | Ghabra et al. | ................ | 73/146 |
| 2006/0055517 A1 * | 3/2006 | Ghabra et al. | ................ | 340/426.11 |
| 2006/0232131 A1 * | 10/2006 | Endo | ................ | 307/10.2 |
| 2007/0118752 A1 * | 5/2007 | Kiessling et al. | ................ | 713/176 |
| 2009/0182461 A1 * | 7/2009 | Wagenhuber et al. | ................ | 701/2 |
| 2012/0029758 A1 * | 2/2012 | Proefke et al. | ................ | 701/29 |
| 2012/0130605 A1 * | 5/2012 | Kuestler | ................ | 701/51 |
| 2012/0173051 A1 * | 7/2012 | Tarnutzer | ................ | 701/2 |
| 2013/0317668 A1 * | 11/2013 | Tarnutzer | ................ | 701/2 |
| 2014/0210677 A1 * | 7/2014 | Fahlbusch et al. | ................ | 343/713 |
| 2014/0250530 A1 * | 9/2014 | Moeller et al. | ................ | 726/23 |
| 2014/0250531 A1 * | 9/2014 | Moeller et al. | ................ | 726/23 |
| 2014/0317729 A1 * | 10/2014 | Naitou et al. | ................ | 726/21 |

* cited by examiner

Primary Examiner — Jonathan M Dager
(74) Attorney, Agent, or Firm — Gerald R. Black, Esq.

(57) ABSTRACT

The CAN based vehicle immobilizer is a vehicle immobilizer which utilizing the CAN bus of the engine (powertrain) CAN connection on the OBDII/J1962 port or the vehicle CAN system, will completely immobilize a vehicle, preventing use of said vehicle and the starting of said vehicle engine. The vehicle immobilizer system can be installed by a $3^{rd}$ party on an aftermarket basis and used to immobilize a vehicle despite an immobilization system being already present on said vehicle is not accessible by said $3^{rd}$ party. The vehicle immobilizer system enables a user to immobilize the vehicle engine efficiently without shorting the CAN network bus lines, and with a minimum of modifications to the vehicle. The vehicle immobilizer system enables a user to immobilize a vehicle from starting the engine and from being driven with minimal modifications to vehicle wiring and with limited to no changes to the vehicle electrical system.

20 Claims, 5 Drawing Sheets

CAN Based Vehicle Immobilizer Components

CAN Based Vehicle Immobilizer Components

CAN Based Vehicle Immobilizer

CAN Based Vehicle Immobilizer with OEM Immobilizer

High-Level Block Diagram of
CAN Based Vehicle Immobilizer

FLOWCHART

CAN BASED VEHICLE IMMOBILIZER

CROSS-REFERENCE TO RELATED APPLICATIONS

This application is related to and claims priority to U.S. Provisional Application No. 61/764,590, entitled "CAN Based Vehicle Immobilizer" (Tarnutzer and Prohaszka) filed on Feb. $14^{th}$, 2013.

FIELD OF THE INVENTION

The invention relates to a CAN based vehicle immobilizer which requires minimal modifications to a vehicle's wiring system and little to no changes to the electrical system enabling said vehicle to be immobilized and prevented from starting.

BACKGROUND OF THE INVENTION

Vehicle immobilizers generally have worked via alterations to the vehicle wiring harness and, or electrical system during diagnostic checks performed by OEM's and various suppliers, while others require a separate control unit with transmitter to be wired into the vehicle electrical system. None, as of yet, utilize the CAN bus in a non-intrusive manner to the vehicle electrical and wiring systems.

U.S. Pat. No. 8,056,538 (Harnack et al.) discloses a method and control module for enabling or disabling control of an engine includes a check module receiving signals through a wiring harness and comparing the check signals to a threshold. The control module also includes an engine control module disabling the engine when the check signals correspond to an unauthorized use.

European Publication No. EP1065112B1 (Coultate et al.) discloses an engine immobilizer operative with an electronically controlled engine, and more specifically to detection of actual engine running conditions in order to re-arm the immobilizer. Use of automotive vehicle security systems employing RF-interrogated transponders has become widespread. Transponders may typically be embedded in the head of a key with a shank for operating a standard mechanical lock on a steering column, for example. Each transponder has a unique digital security code which is transmitted to a vehicle security module and then compared to authorized codes stored within the vehicle security module. The security module may be a stand-alone module or may be more typically incorporated into an electronic engine control module which performs the engine control functions and executes an appropriate engine control strategy.

U.S. Pat. No. 6,853,956 (Ballard, Jr., et al.) discloses a sobriety interlock system having an alcohol detection device electrically connected to a computing device is provided. An electronic circuit is electrically connected between the computing device and an OBD-II port on a machine for receiving data related to operation of the machine. A breath sample is provided by an operator of the machine and the alcohol detection device determines the alcohol concentration of the breath sample. The computing device determines a blood alcohol concentration for the operator based on the breath alcohol concentration, and the computing device prevents or enables operation of the machine based on the level of the blood alcohol concentration. A memory device stores machine operation data received through the OBD-II port.

U.S. Pat. No. 5,675,490 (Bachuber) discloses an immobilizer for a motor vehicle and a method for operating the immobilizer include a test unit, control devices connected through a data line to the test unit, and at least one ignition key having a transponder. When the ignition key is actuated, the test unit transmits a request signal through the data line to all of the control devices, which respond thereto by transmitting back identification codes which are compared with desired codes. The test unit prevents starting of the motor if fewer than a prescribed number of control devices reply with their identification code. The test unit enables all of the control devices if at least the prescribed number of control devices reply with their identification code word, in the event of interrogation.

European Publication No. EP0525979B1 (Pucci et al.) discloses systems which are most frequently operated by a remote controlled transmitter which transmits a code, when activated by the user, to a receiver in the vehicle. The receiver interprets the code and authorizes it if correct, and enables or disables the immobilizing mechanism fitted to the vehicle. Some systems operate automatically with the immobilizer being enabled within a certain time after the ignition has been switched off, or the key completely removed.

U.S. Publication No. US20120280805 (Magner et al.) discloses a control module which provides for immobilization of a vehicle. The control module includes an intelligent control disposed within a housing of the control module, a plurality of discrete inputs and a plurality of discrete outputs operatively connected to the intelligent control, at least one network interface operatively connected to the intelligent control, at least one user interface operatively connected to the intelligent control, and software stored for execution by the intelligent control, the software providing instructions to control functions of a vehicle associated with the control module, the functions including vehicle immobilization functions.

U.S. Publication No. US20130226795 (Hopper et al.) discloses a vehicle immobilizing device which includes a lock, a user interface, memory configured to store an unlock code, and a processor. The lock has a latch mechanism and the processor controls movement of the latch mechanism from a locked position to an unlocked position so that the immobilizing device can be removed from a vehicle. A person installing the immobilizing device on a vehicle utilizes the user interface to enter and store an unlock code and an identification code in the device memory at the time of installation. Upon payment of an outstanding fine, a vehicle owner is provided with an unlock code. To remove the device from the vehicle the owner utilizes the user interface to enter an unlock code and the processor causes the latch mechanism to move to the unlocked position upon determining that the unlock code input via the user interface matches an unlock code stored in the memory.

Many of these systems are intended to be used by an OEM and are factory installed.

What is needed is a vehicle immobilizer system which can be installed by a $3^{rd}$ party on an aftermarket basis that will be used to immobilize a vehicle despite an immobilization system being already present on the vehicle that, however, is not accessible by said $3^{rd}$ party.

What is needed is a vehicle immobilizer system which will enable the user to immobilize the vehicle engine efficiently without shorting the CAN network bus lines, with a minimum of modifications to the vehicle, via the CAN bus on the standard OBDII/J1962 connector or directly on the CAN vehicle network.

What is needed is a vehicle immobilizer system which will enable the user to immobilize a vehicle from starting the engine and being driven with minimal modifications to vehicle wiring and with limited to no changes to the vehicle electrical system.

This invention performs its immobilization on the logical side of the CAN transceiver, where other methods may manipulate the physical CAN high and low bus lines.

SUMMARY OF THE INVENTION

The CAN based vehicle immobilizer of the present invention addresses these needs.

As used herein CAN refers to a CAN bus (for the "controller area network") which is a standard communication bus standard designed to enable microcontrollers and devices (vehicle control modules) to communicate with each other within a vehicle.

The CAN based immobilizer of the present invention is part of a control module and operates with the CAN bus.

A CAN bus is a vehicle bus standard designed to enable microcontrollers and devices to communicate with each other within a vehicle without a host computer.

The CAN based immobilizer of the present invention includes a processor. The CAN based immobilizer of the present invention immobilizes a specific sub-system or sub-network (e.g.—the engine electronic control unit, the transmission engine electronic control unit, the antilock brakes engine electronic control unit).

The goal of this invention is to immobilize a vehicle from being started and driven with minimal modifications to the vehicle wiring, involving limited or no changes to the vehicle electrical system. The engine immobilizer of the present invention can be installed on the vehicle and connected to the vehicle's CAN bus non-intrusively via the standard OBDII/J1962 or OBDII connector or directly on a vehicle CAN network. The engine immobilizer is to be installed and, or connected to the proper (engine/powertrain) CAN bus subsystem. In order to properly function, the CAN based vehicle immobilizer needs to be connected to the specific CAN bus where all engine or powertrain control related control modules are connected. When the engine immobilization feature on the micro controller is activated, the vehicle is immobilized preventing the engine from starting, thereby preventing vehicle operation.

The method of CAN based immobilization of the present invention, initially, must determine if immobilization of an ECU-subsystem needed. If so, the appropriate ECU-subsystem is selected to immobilize. The CAN bus is made to be "busy" for communications from other ECUs to the selected ECU-subsystem, preventing the other ECUs from transmitting CAN messages to the selected ECU on the CAN bus, immobilizing the selected ECU-subsystem. The method of the present invention enables the device to withstand the harsh environment of the vehicle CAN bus while the currently standard requirement or practice to cut or splice the vehicle harness is eliminated, saving time and money during installation and leaving the vehicle in OEM and warranty eligible condition.

For a more complete understanding of the CAN based vehicle immobilizer of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

Figure 1:
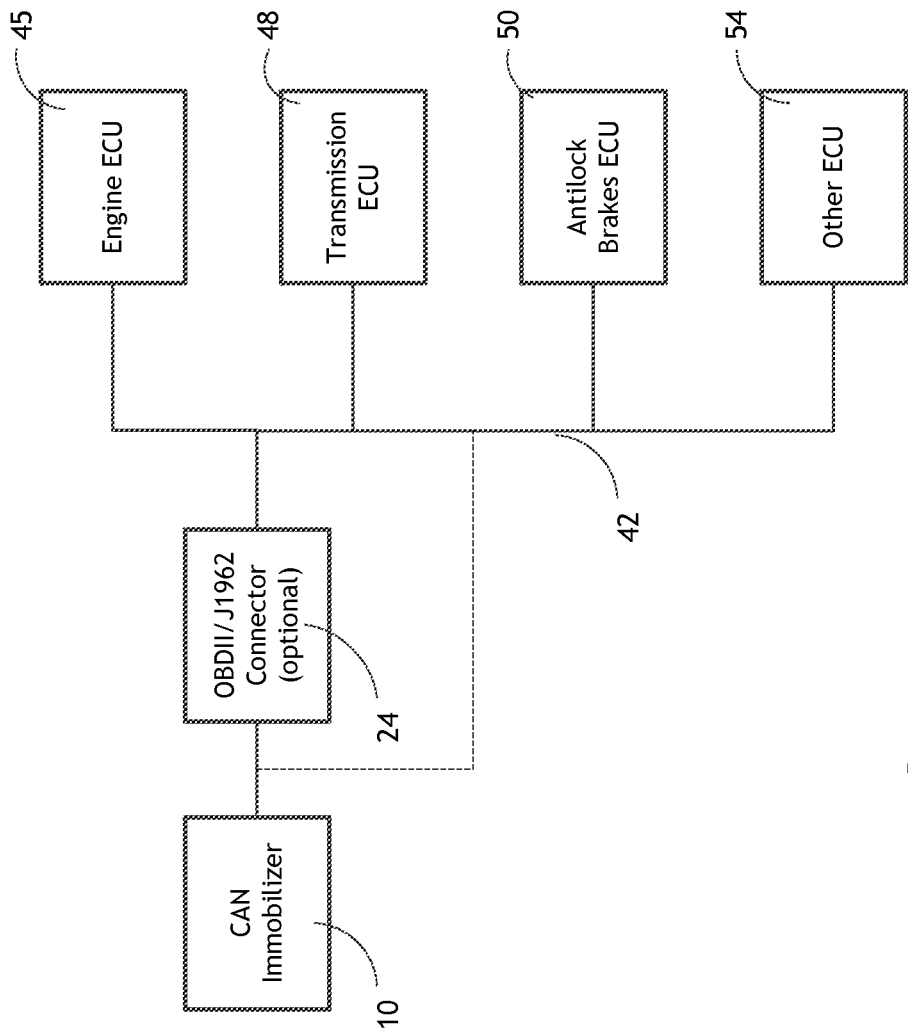
FIG. 1 discloses the CAN immobilizer of the present invention in conjunction with an OBDII/J1962 connector, which is optional, the CAN bus, and the various electronic control modules which may be immobilized.
Figure 2:
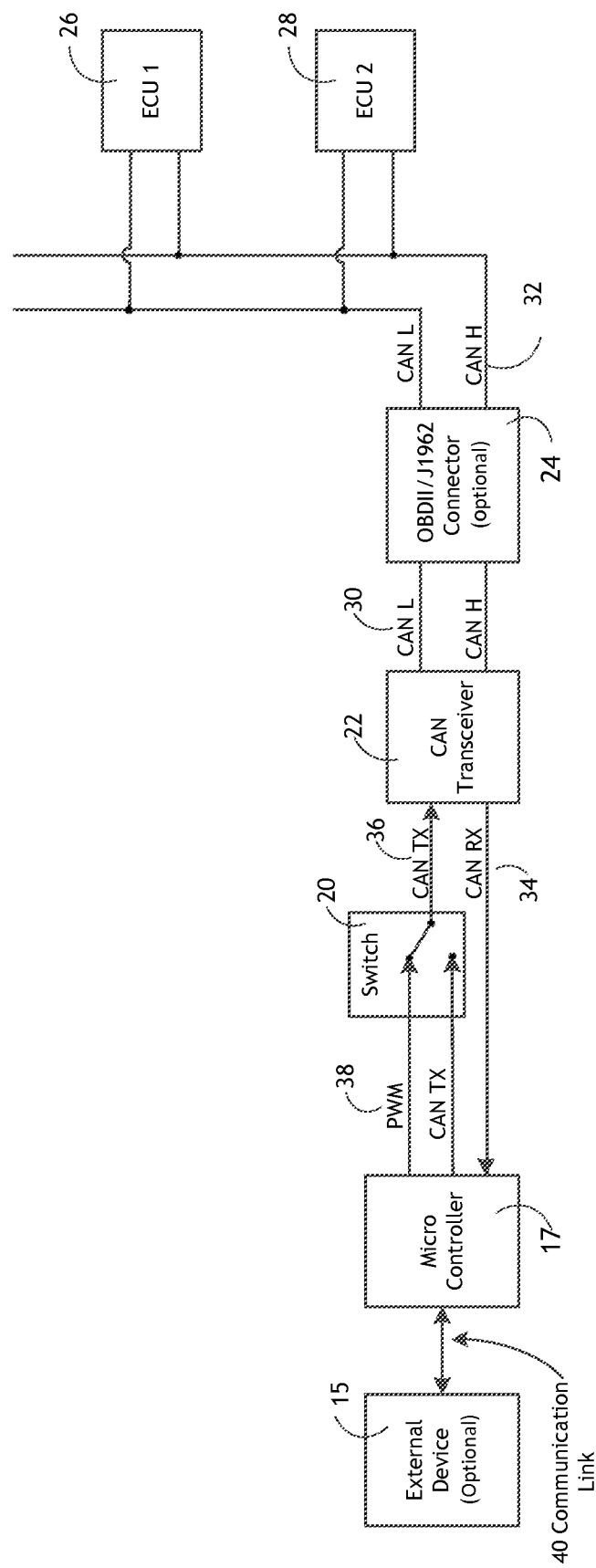
FIG. 2 discloses a detailed block diagram of a first preferred embodiment of the CAN based vehicle immobilizer of the present invention in the alternative embodiment in which the vehicle CAN network is utilized and the CAN TX (transmit) line is pulse width modulated.

Referring now to FIGS. 1 and 2, the first preferred embodiment of the CAN based vehicle immobilizer [10] of the present invention in a simple block diagram is depicted. The CAN based vehicle immobilizer [10] is connected to the OBDII/J1962 Connector [24], which in turn enables the CAN based vehicle immobilizer [10], working through the OBDII/J1962 Connector [24], to interact with the engine ECU [45], the transmission ECU [48], the anti-lock brakes [50], and any other ECU [54] connected to the CAN network. Through this interaction, the ECU [48], ABS [50], and/or other ECUs [52] can be individually controlled and disabled as needed for diagnostic purposes, or they can all be disabled together.

The micro pin is pulse width modulated (PWM'd) [38] directly or via micro pulse width modulation at a frequency wherein the CAN transceiver [22] outputs a series of CAN dominant and non-dominant signals, preventing other control units from transmitting CAN messages on the vehicle communication bus thus immobilizing the vehicle as other control modules are unable to perform their standard functions due to lack of, or inability, to communicate with one another. The immobilizer method of the present invention causes the CAN bus [42] to be "busy" so no control module is able to communicate.

A CAN transceiver [22] is used to interface the micro controller [17] to the physical CAN bus [42]. A pin on the micro controller interfaces to the CAN transceiver transmit pin (TX) [36], either directly or through a switch, with the micro CAN transmit pin. The micro pin is pulse width modulated (PWM'd) [38] either directly or via micro pulse width modulation feature at a frequency such that the CAN transceiver [22] outputs a series of CAN dominant and non-dominant signals, preventing other control units from transmitting CAN messages on the vehicle communication bus and, thereby, immobilizing the vehicle as other control modules are unable to perform their standard functions due to either the lack of or inability to communicate with each other.

A CAN transceiver [22] is used to interface the micro controller [17] to the physical CAN bus [42]. A pin on the micro controller [17] is used to interface to the CAN transceiver transmit pin, either directly or through a switch with the micro CAN transmit pin.

FIG. 2 is a block diagram of the first preferred embodiment of the CAN based vehicle immobilizer [10] of the present invention. The CAN based vehicle immobilizer [10] interfaces with the micro CAN transmit pin and the micro controller [17] CAN cell with the option to also interface with an external device [15] via a communication link [40]. The micro controller [17] connects to the switch [20] via the PWM [38] and CAN TX [36] pins with the switch interfacing with the CAN transceiver [32] which can be connected to an optional OBDII/J1962 [24] port via the CAN L [30] and CAN H [32] pins. From here, either with or without the optional OBDII/J1962 port [24], the CAN Transceiver [32] can then interface with the ECU 1 [26], and ECU 2 [28] or any other ECU on this CAN network. The CAN transceiver [24] can also be directly connected to the microcontroller [17] with a switch [20] if necessary. The micro controller [17] transmits a high priority CAN message at high bus utilization (causing essentially the CAN bus [42] to become "busy" for all other control modules), preventing other control units from transmitting CAN messages.

The micro controller [17] can optionally have a link or communication channel to an external device [15] which can request the feature to be activated. This provides many integration options for this approach, such as supporting requests from a cell enabled device, a blue tooth enabled device, and directly connected devices.

A micro controller [17] interfacing to a vehicle CAN network causes CAN network disturbances or high bus utilization, whereby other control modules on the CAN bus [42] are prevented from transmitting on the CAN bus [42]. When other control modules cannot transmit, the vehicle is prevented from starting and is immobilized, not enabling functionality needed to enable operation of said vehicle.

A micro controller [17] interfacing to a vehicle CAN network is used to cause CAN network disturbances or high bus utilization such that other control units on the CAN bus [42] are prevented from transmitting on the CAN bus [42]. When other control units cannot transmit, this immobilizes vehicles from being able to start their engine or from performing certain functionality needed to make the vehicle operational.

A combination of the first and the second preferred embodiments can also be used with the same effect to immobilize the vehicle.

The micro controller [17] can optionally have a link or communication channel to an external device which requests the feature to be activated. This provides many integration options for this novel approach, such as supporting requests from a cell enabled device, blue tooth enabled device, and even directly connected devices.

Figure 3:
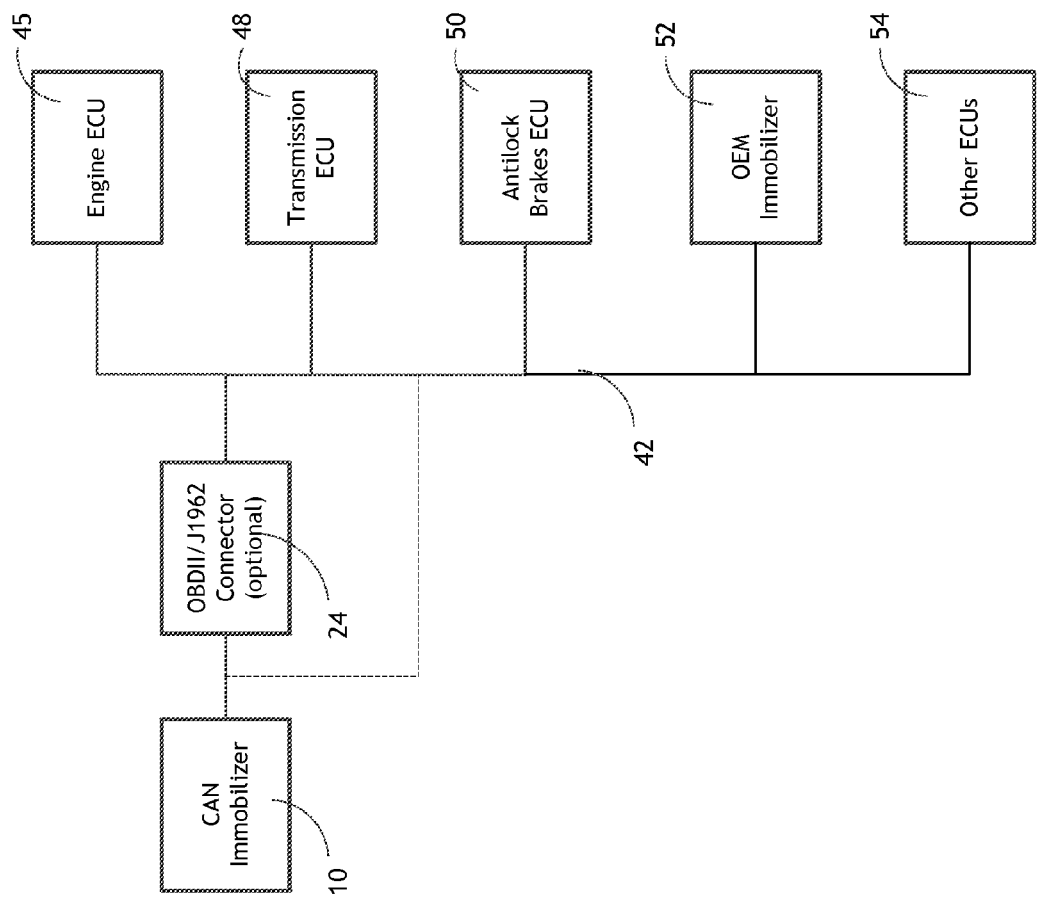
FIG. 3 discloses the CAN immobilizer of the present invention in conjunction with an OBDII/J1962 connector, which is optional, the CAN bus, an OEM Immobilizer, and the various electronic control modules which may be immobilized.

FIG. 3 discloses the CAN immobilizer of the present invention in conjunction with an OBDII/J1962 connector [24], which is optional, the CAN bus [42], an OEM Immobilizer [52], and the various electronic control modules which may be immobilized.

Figure 4:
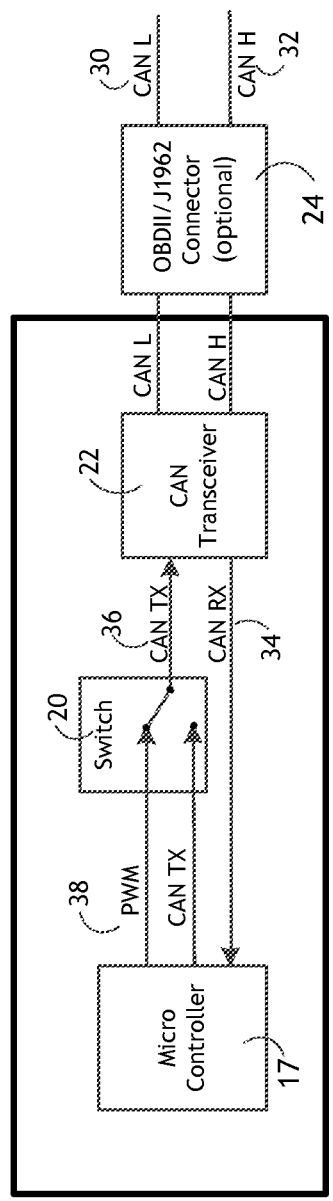
FIG. 4 discloses a detailed block diagram of a second preferred embodiment of a high-level block diagram of the CAN based vehicle immobilizer of the present invention, with the micro controller, switch CAN transceiver, and the OBDII/J1962 connector.

FIG. 4 discloses a detailed block diagram of a second preferred embodiment of a high-level block diagram of the CAN based vehicle immobilizer of the present invention [10], with a micro controller [17], a switch CAN transceiver [50], and the OBDII/J1962 connector [24]. The micro controller [17] connects to the switch [20] via the PWM [38] and CAN TX [36] pins with the switch interfacing with the CAN transceiver [32] which can be connected to an optional OBDII/ J1962 [24] port via the CAN L [30] and CAN H [32] pins. From here, either with or without the optional OBDII/J1962 port [24].

Figure 5:
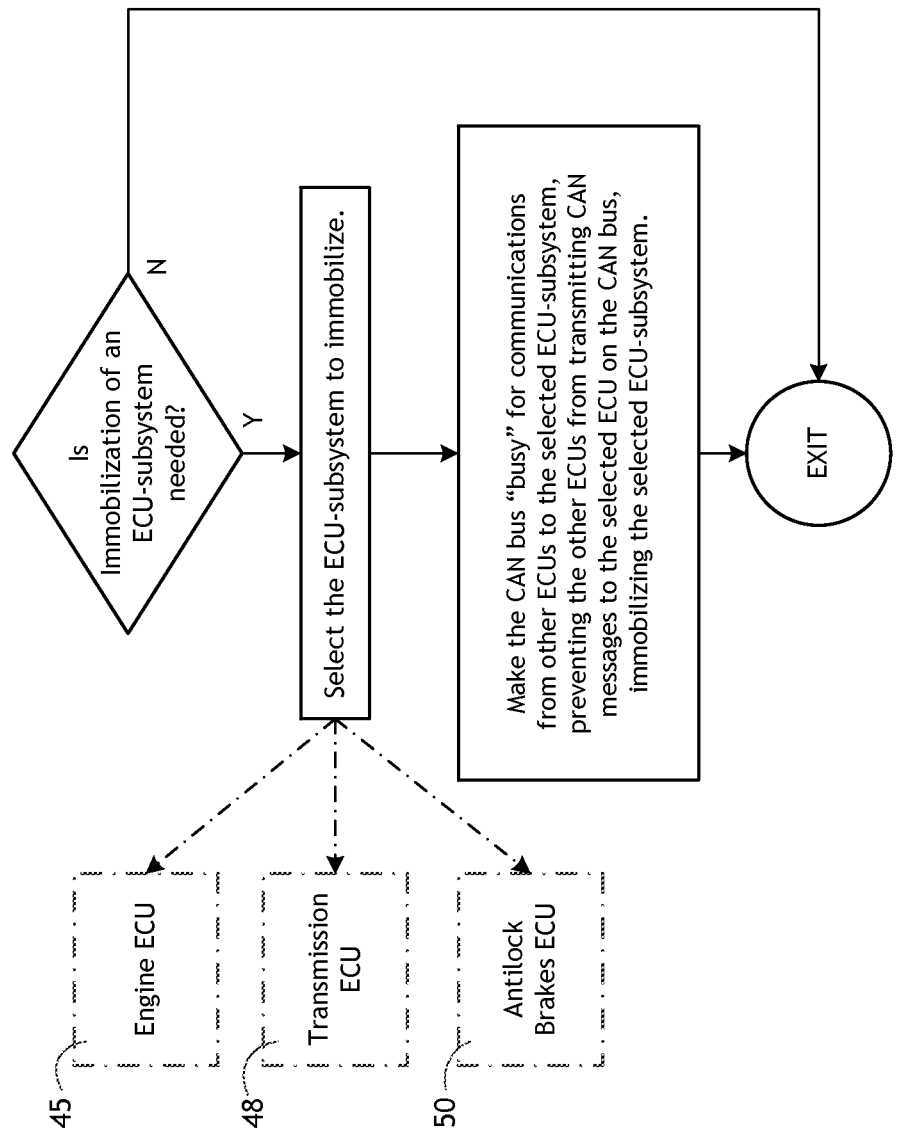
FIG. 5 is a simplified logic diagram showing the method of CAN based immobilization of the present invention.

FIG. 5 is a simplified logic diagram showing the method of CAN based immobilization of the present invention. Initially, it must be determined if immobilization of an ECU-subsystem needed. If immobilization of an ECU-subsystem needed, the appropriate ECU-subsystem is selected to immobilize. The CAN bus is made to be "busy" for communications from other ECUs to the selected ECU-subsystem, preventing the other ECUs from transmitting CAN messages to the selected ECU on the CAN bus, immobilizing the selected ECU-subsystem. The immobilizer of the present invention is installable by an aftermarket supplier, where the aftermarket supplier does not require access to an immobilizer system installed on the same vehicle by an OEM.

This method disturbs the CAN bus [42] by creating a 100% bus utilization condition preventing vehicle control modules from transmitting, or by creating an invalid signal pattern on the CAN bus [42] inducing CAN protocol errors that prevent vehicle control modules from transmitting messages to other control modules which are needed to operate the vehicle. Any diagnostic trouble codes (DTCs) or fault lights caused in the vehicle by this method can be cleared or turned off via proper CAN commands sent from the CAN based vehicle immobilizer [10] of the present invention via its CAN bus connection used for the immobilization.

Throughout this specification, various Patent and Applications are referenced by application number and inventor. The disclosures of these Patents and Applications are hereby incorporated by reference in their entireties into this specification in order to more fully describe the state-of-the-art.

It is evident that many alternatives, modifications, and variations of the present invention and any others disclosed herein of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10. CAN Immobilizer
12. Steering Wheel
15. Optional External Device
17. Micro Controller
20. Switch
22. CAN Transceiver
24. Optional OBDII/J1962 Connector
26. ECU 1
28. ECU 2
30. CAN L
32. CAN H
34. CAN RX
36. CAN TX
38. PWM
40. Communication Link
42. CAN Bus
45. Engine ECU
48. Transmission ECU
50. Antilock Brakes ECU
52. OEM Immobilizer
54. Other ECUs

The invention claimed is:

1. A control module for a vehicle, said control module comprising:
   a. a CAN bus; and
   b. an immobilizer having a processor, said immobilizer processor being capable of immobilizing said CAN bus, said immobilizer being installable by an aftermarket supplier;
   whereby said immobilizer processor causes said CAN bus to be busy for other control modules, preventing said other control modules from transmitting CAN messages to other control units on said CAN bus, thereby immobilizing said vehicle as said other control modules are unable to perform standard functions due to an inability of said other control modules to communicate with each other.

2. The control module of claim 1, wherein said immobilizer interfaces with a micro pin, said micro pin includes pulse width modulation or digital output manipulation.

3. The control module of claim 1, wherein said immobilizer interfaces with a micro controller CAN cell.

4. The control module of claim 1, wherein said processor transmits a high priority CAN message at high bus utilization.

5. The control module of claim 2, wherein said modulation is at a frequency wherein a CAN transceiver outputs a series of CAN dominant or non-dominant signals.

6. The control module of claim 1, wherein said immobilizer interfaces with a micro pin, said micro pin includes pulse width modulation or digital output manipulation.

7. The control module of claim 1, wherein said immobilizer interfaces with a micro controller CAN cell.

8. The control module of claim 1, wherein said processor transmits a high priority CAN message at high bus utilization.

9. A control module for a vehicle, said control module comprising:
   a. a CAN bus;
   b. a first immobilizer having a first processor, said first immobilizer processor being capable of immobilizing said vehicle, said first immobilizer being inaccessible to an aftermarket supplier; and
   c. a second immobilizer having a second processor, said second immobilizer processor being capable of immobilizing said CAN bus, said second immobilizer being installable by said aftermarket supplier;
   whereby said immobilizer processor causes said CAN bus to be busy for other control modules, preventing said other control modules from transmitting CAN messages to other control units on said CAN bus, thereby immobilizing said vehicle as said other control modules are unable to perform standard functions due to an inability of said other control modules to communicate with each other.

10. The control module of claim 9, wherein said immobilizer interfaces with a micro pin, said micro pin includes pulse width modulation or digital output manipulation.

11. The control module of claim 9, wherein said second immobilizer interfaces with a micro controller CAN cell.

12. The control module of claim 9, wherein said second processor transmits a high priority CAN message at high bus utilization.

13. The control module of claim 10, wherein said modulation is at a frequency wherein a CAN transceiver outputs a series of CAN dominant or non-dominant signals.

14. The control module of claim 9, wherein said immobilizer interfaces with a micro pin, said micro pin includes digitally manipulation or via micro pulse width modulation.

15. The control module of claim 9, wherein said second immobilizer interfaces with a micro controller CAN cell.

16. The control module of claim 9, wherein said second processor transmits a high priority CAN message at high bus utilization.

17. A method to immobilize one of a plurality of electronic control modules of a vehicle using an immobilizer, said method comprising:
   a. determining if immobilization of one of said plurality of electronic control modules is needed;
   b. selecting which one of said plurality of electronic control modules to immobilize; and
   c. causing said CAN bus to be busy for communications from other control modules to said one of said plurality of electronic control modules, thereby preventing said other control modules from transmitting CAN messages to said one of said plurality of electronic control modules on said CAN bus, immobilizing said one of said plurality of electronic control modules;
   whereby said immobilizer is installable by an aftermarket supplier, said aftermarket supplier not requiring access to an immobilizer system installed on said vehicle by an OEM.

18. The method of claim 17, wherein said vehicle includes an OEM immobilizer.

19. The method of claim 17, further comprising a micro controller transmitting a high priority CAN message at high CAN bus utilization.

20. The method of claim 17, further comprising a micro pin, said micro pin being pulse width modulated or digitally manipulated directly or via micro pulse width modulation at a frequency wherein a CAN transceiver outputs a series of CAN dominant and non-dominant signals.

* * * * *